Patented Sept. 5, 1950

2,521,553

UNITED STATES PATENT OFFICE 2,521,553

METHOD FOR PRODUCING A MODIFIED CANDELILLA WAX

Cyril S. Treacy, Scarsdale, N. Y., assignor to Mamaroneck Chemical Corporation, Mamaroneck, N. Y., a corporation of New York No Drawing. Application February 16, 1946, Serial No. 648,197

6 Claims. (Cl. 260—405)

This invention relates to the production of modified candelilla wax having a greater value and wider field of application in industrial products than the present candelilla wax sold in the market.

Candelilla wax is unique in its properties and is the only natural wax containing a substantial percentage of hydrocarbons, commonly about 30 per cent, the same being composed according to information in the literature of straight chain hydrocarbons of an approximate formula $C_{31}H_{64}$ or $C_{33}H_{68}$, said hydrocarbons being in admixture with a proportion of esters, free acids and free alcohols together with small amounts of impurities. To the applicant's knowledge, the literature does not reveal the chemical constitution of these lesser constituents which contribute to the unique properties of the wax. Positive identification of the various constituents would require years of intensive research or testing. Candelilla wax is characterized by having normally a substantial tackiness and a relatively medium melting point. The tackiness prevents the use of such wax in many fields for which it would otherwise be suitable.

Accordingly, an object of the present invention is to produce modified candelilla wax products having decreased tackiness. It is also an object to provide a process capable of increasing the hardness and raising the melting point of the candelilla wax.

Other objects of the invention are in part obvious and will in part appear hereinafter.

Broadly, the present invention involves reacting raw candelilla wax with a small amount of an organic acid, the reaction being preferably accomplished by melting the wax and while the same is in molten condition, treating the same with the acid during stirring, the treatment being continued until the water of the reaction is driven off and the desired properties obtained.

The exact nature of the reaction has not been determined and could not be determined in the absence of extensive research, but the following observations concerning the same give definite indications of the character of the reaction. The reaction of the small amount of acid causes liberation of water which means that whatever the whole action might be it includes esterification of alcoholic hydroxy groups of some unidentified constituent or constituents, which result is confirmed by a comparison of the acetyl value and the esterification value of the modified candelilla wax product with those of the untreated wax. When the wax has been treated with an organic acid free of hydroxy groups, the acetyl value is lowered and the ester value is increased.

The modified candelilla wax products produced by the above-described process possess several distinctive properties including a higher melting point, a practically non-tacky feel, and also a greater hardness which with some acids may be only slightly greater. Hence, they are suitable for many uses where the conventional candelilla wax of commerce cannot be employed because of its tackiness or too low melting point.

Since the above-mentioned properties of the modified candelilla wax follow from the above-described reaction with a limited amount of organic acid, the essence of the process of the present invention resides in the treatment of the raw wax with small amounts of acids sufficient to produce the described improved properties to the desired degree. Acetic and formic acids in small amounts produce products which though higher in melting point are considerably tougher though not materially harder.

The amount of acid ordinarily employed in the present process may be expressed as that quantity which esterifies the candelilla wax constituents to an extent which only partially reduces the alcoholic hydroxy content. With all acids tested, the amount sufficient to produce good results has been between about 2 to 6 per cent. When complex acids are to be employed, ordinarily larger amounts can be used to obtain a greater increase in melting point, but generally the increased amount does not justify its use, for it is uneconomical. No substantial improvement of the properties is generally obtained by such increase. An amount of any of the acids which reduces the acetyl value to a figure approaching about 15 gives a commercially desirable product. Satisfactory reduction of the tackiness and a decidedly worthwhile increase in melting point can be obtained generally with a reduction of acetyl value to a point within the range of about 15 to 20.

From considerable experimentation it appears that partial esterification with very small amounts of organic acids as a class produce products of higher melting point which are either harder or tougher than the untreated wax. The various acids, however, differ in their suitability in that some acids result in higher melting point products than others and some require larger amounts to accomplish the same results. Experimentation with many acids indicates that the following are operable:

1. Aliphatic monobasic and polybasic, saturated and unsaturated straight and branched chain aliphatic acids. For example: (a) Aliphatic monobasic acids preferably having from 3 to 5 carbon atoms: propionic acid, butyric acid, iso-butyric, valeric, iso-valeric, caproic, iso-caproic, acrylic, crotonic, vinyl-acetic, lactic, and the like. (b) Aliphatic polybasic: oxalic acid, malonic, succinic, maleic, methyl-maleic, methyl-succinic, malic, tartaric, and the like.

2. Alicyclic acids, including monobasic, polybasic, saturated and unsaturated, such for example as: abietic acid.

3. Aromatic monobasic, polybasic, saturated and unsaturated acids, preferably having from 7 to 11 carbon atoms, such for example, as benzoic acid, toluic, phenyl-acetic, phenyl-succinic, cinnamic, naphthalic, and the like, also phthalic, mesitic, and the like.

It is to be understood that where the anhydride of any acid of the above-mentioned classes is known, it is preferably employed in the present process instead of the acid itself. It is also to be understood that mixtures of any of the above-mentioned acids or their anhydrides may likewise be employed.

In carrying out the process, the acid or acid anhydride is brought into contact with the wax and the mixture heated until water vapor is split off and condensation occurs. The mixing of the acid with the wax may be accomplished in any suitable manner. For example, the wax may be melted and the acid, if solid, stirred into the molten wax, or the wax may be dissolved in the acid when the acid is liquid and the wax is soluble therein. In some cases, the acid may be melted and the wax, either solid or molten, may be stirred therein. Finally, the wax and acid may be dissolved separately in suitable miscible solvents and the solution mixed, or both the wax and the acid may be dissolved in a common solvent.

The temperature of the mixture should be raised at least to the boiling point of water and may be raised to 200° C. but is preferably raised to 150° C. and the heating continued for sufficient time to distill off any water resulting from condensation, for example, from one to three hours. The wax-like condensate may be separated from extraneous matter or impurities by treatment with an absorbent such for example as fuller's earth, diatomaceous earth, activated carbon, silica gel and the like, and then filtering.

The results set forth in the following table illustrate the new characteristics which are imparted to candelilla wax by treatment with various acids and acid anhydrides in accordance with the process of the present invention.

| | Candelilla Wax and Acid, Parts by Weight | Sap. No. | Acid No. | Ester No. | Iodine No. | Acetyl No. | M. P. |
|---|---|---|---|---|---|---|---|
| | | | | | | | °C. |
| a | Untreated wax | 56.8 | 21.6 | 35.2 | 24.9 | 29.1 | 70 |
| b | 400 wax and 8.5 lactic | 64.6 | 15.4 | 49.2 | 27.6 | 29.9 | 72 |
| c | 350 wax and 20 rosin (crude abietic) | 63.8 | 21.2 | 42.6 | 32.1 | 32.6 | 72 |
| d | 100 wax and 3 phthalic anhy | 75.3 | 28.5 | 46.8 | 24.8 | 15.8 | 72 |
| e | 400 wax and 18 benzoic | 64.8 | 23.5 | 41.3 | | | 72 |
| f | 400 wax and 22 salicylic | 68.9 | 19.9 | 49.0 | | | 71.5 |

It will be observed from the above table that the modified wax products of the present invention differ in both chemical and physical properties from the original or untreated wax. It will also be seen that the small amount of acid used was insufficient in any case to reduce the acetyl number (the alcoholic OH content) of the wax treated to a figure lower than about 15. In Examples b and c using lactic and rosin acids, respectively, the acetyl value of the final product does not show a reduction from that of the raw candelilla wax for the reason that the acid employed itself introduces alcoholic hydroxy groups. However, in such processes the acetyl value attributable to the alcoholic OH groups in the original or unmodified wax constituents is reduced by about 50 per cent.

In view of the similarity of the results obtained by the reaction of various agents with the candelilla wax, it appears sufficient to illustrate the invention by giving four examples of the complete reaction, one employing an aromatic acid, two an aliphatic acid and a third an alicyclic acid. The other acids hereindisclosed can be substituted in equivalent amounts.

*Example I*

3000 g. of candelilla wax, which has a melting point of 68–70° C., is melted and heated to 130° C. until any water contained in the wax has been driven off. The dry wax is then heated quickly to 148° C. and 90 g. of phthalic anhydride is added over a period of seven minutes with constant stirring, and the mixture heated for two hours. The temperature is then raised to 150° C. to distill off any unreacted phthalic anhydride. The molten product is then filtered with 50 g. of fuller's earth.

The modified wax product obtained is rust-colored, becomes very hard and dry upon cooling and is non-tacky as compared to the original wax. If the product is heated for three additional hours at 140° C. with an additional quantity of 90 g. of phthalic anhydride, a further condensation appears to take place with the evolution of water. The melting point is also increased slightly so that the melting point of the final product is 72° C.

*Example II*

To 400 g. of candelilla wax, melted at 90° C. are added 10 g. of 85 per cent lactic acid, and the temperature raised slowly to 190° C. and maintained at such temperature for one hour. Upon cooling, the product solidifies to a very hard dry wax which is non-tacky as compared with the original wax and the melting point of the product is 72° C.

*Example III*

To 350 g. of candelilla wax, melted at 115° C., 200 g. of rosin are added. The mixture is heated with stirring to 190° C. and held at that temperature for two hours. The product is a hard dry wax, practically devoid of tackiness and having a melting point of 72° C.

The wax treated in the foregoing examples is raw candelilla wax filtered to remove extraneous matter.

*Example IV*

Raw candelilla wax in melted condition is treated with 3 per cent of acetic anhydride by boiling and refluxing the mixture for 2 hours and thereafter heating to 200° C. in an open vessel to remove the water of condensation. The product obtained is decidedly tougher than the untreated raw wax. It is also less tacky and has an increased melting point amounting to 71° C.

Other acids tried and found operable in the treatment of the raw candelilla are, for example, formic, myristic, stearic and maleic acids, 3 per cent of acid being used except as to the last mentioned, of which only 2 per cent was employed.

The treatment of raw candelilla wax with phosphoric acid, an inorganic acid, results in a charred mass thereby indicating that the process of the present invention is restricted to organic acids. The successful results obtained by the use of acids of diverse structure and molecular weight hereindisclosed evidences the conclusion that the invention involves a class reaction of organic acids with the raw candelilla wax. The successful use of formic, acetic, myristic, and stearic acids shows that aliphatic acids of both low and high molecular weight are operable. The successful use of phthalic, benzoic, and salicylic acids shows that aromatic acids are operable. Results with lactic and salicylic acids shows that hydroxy acids of both aliphatic and aromatic structure are operable. The use of phthalic and maleic acids shows that dicarboxylic acids of both aromatic and aliphatic structure are operable and that the aliphatic radical may be unsaturated. The results with abietic acid or rosin shows that alicyclic acids are likewise operable.

The process of the present invention has several outstanding advantages. It is applied to candelilla wax in its raw state and hence makes unnecessary any prior bleaching or other chemical treatment. It also has the substantial advantage of employing only a small amount of acid. Hence the production of the modified wax may be accomplished at a low over-all cost.

The modified candelilla wax products of the present invention having a melting point above 70° C. up to 75° C. and an acetyl value of not less than about 15 have utility in several fields where the original or unmodified candelilla wax cannot be used. For example, the modified candelilla wax may be substituted for more expensive carnauba wax. The modified waxes of the invention may be used in making phonograph records, dental plates, and other molded products. They have particular utility in the production of coatings such as in the manufacture of stencil sheets, carbon paper, wax paper, lacquers and the like. Their usefulness in these fields is attributable to their hardness, their high melting point, their practical absence of tackiness and their low cost. Other uses for the new wax products lie in the making of candles, polishes, wax emulsions, sealing wax, paint removers, and in general other products where hard, high melting point waxes are employed.

This application is a continuation-in-part of an application bearing Serial No. 419,980, now abandoned, filed on November 21, 1941.

It should be understood that the present invention is not limited to the specific details and acid compounds hereindescribed but that it extends to all equivalent procedures and compounds which will occur to those skilled in the art upon consideration of the scope of the claims appended hereto.

I claim:

1. A process for producing a modified candelilla wax which comprises reacting raw candelilla wax with from about two to six per cent by weight of an acidic reactant selected from the group consisting of organic acids and their anhydrides at a temperature above the boiling point of water at which water of condensation is liberated, and until esterification has occurred whereby a modified candelilla wax product is obtained having less tackiness and a higher melting point than the raw candelilla wax from which it is produced.

2. A process for producing a modified candelilla wax which comprises reacting raw candelilla wax with from about two to six per cent by weight of an acidic reactant selected from the group consisting of aliphatic acids having from one to eighteen carbon atoms in the molecule and their anhydrides at a temperature above the boiling point of water at which water of condensation is liberated, and until esterification has occurred whereby a modified candelilla wax product is obtained having less tackiness and a higher melting point than the raw candelilla wax from which it is produced.

3. A process for producing a modified candelilla wax which comprises reacting raw candelilla wax with from about two to six per cent by weight of a low molecular weight fatty acid of at most two carbon atoms at a temperature above the boiling point of water at which water of condensation is liberated, and until esterification has occurred whereby a modified candelilla wax product is obtained having less tackiness and of a greater toughness than the raw candelilla wax from which it is produced.

4. A process for producing a modified candelilla wax which comprises reacting raw candelilla wax with from about two to six per cent by weight of an acidic reactant selected from the group consisting of aromatic acids of seven to eleven carbon atoms and their anhydrides at a temperature above the boiling point of water at which water of condensation is liberated, and until esterification has occurred whereby a modified candelilla wax product is obtained having less tackiness and a higher melting point than the raw candelilla wax from which it is produced.

5. A process for producing a modified candelilla wax which comprises reacting raw candelilla wax with from about two to six per cent by weight of an acidic reactant selected from the group consisting of organic acids and their anhydrides at a temperature of from 150°–200° C. at which condensation takes place and until esterification has occurred and as well the vaporization of the water of reaction has occurred, whereby a modified candelilla wax product is obtained having less tackiness and a higher melting point than the raw candelilla wax from which it is produced.

6. A process for producing a modified candelilla wax which comprises reacting raw candelilla wax with from about two to six per cent by weight of an acidic reactant selected from the group consisting of organic acids and their anhydrides at a temperature of from 150°–200° C. at which condensation takes place for a period of from one to three hours, whereby a modified candelilla wax product is obtained having less tackiness and a higher melting point than the raw candelilla wax from which it is produced.

CYRIL S. TREACY.

REFERENCES CITED

The following references are of record in the file of this patent:

UNITED STATES PATENTS

| Number | Name | Date |
| --- | --- | --- |
| 1,815,615 | Ellis | July 21, 1931 |
| 1,825,248 | Pungs | Sept. 29, 1931 |
| 1,825,249 | Pungs | Sept. 29, 1931 |
| 2,166,711 | Beach | July 18, 1939 |
| 2,340,846 | Landes | Feb. 1, 1944 |
| 2,406,336 | Auer | Aug. 27, 1946 |

OTHER REFERENCES

Leukowitsch, Chem. Tech. and Anal. of Oils, Fats, and Waxes, 6th edit., vol. II, pages 890, 891, and 892.